(12) United States Patent
Ishibashi

(10) Patent No.: US 8,984,087 B2
(45) Date of Patent: Mar. 17, 2015

(54) COMMUNICATION APPARATUS PROVIDED WITH NETWORK INTERFACES, CONTROL METHOD THEREFOR, AND STORAGE MEDIUM STORING CONTROL PROGRAM THEREFOR

(75) Inventor: Kaori Ishibashi, Omihachiman (JP)

(73) Assignee: Canon Kabushiki Kaisha (JP)

( * ) Notice: Subject to any disclaimer, the term of this patent is extended or adjusted under 35 U.S.C. 154(b) by 114 days.

(21) Appl. No.: 12/895,947

(22) Filed: Oct. 1, 2010

(65) Prior Publication Data

US 2011/0082909 A1    Apr. 7, 2011

(30) Foreign Application Priority Data

Oct. 2, 2009    (JP) .................. 2009-230595

(51) Int. Cl.
*G06F 15/16* (2006.01)
*G06F 15/173* (2006.01)
*H04L 29/08* (2006.01)
(Continued)

(52) U.S. Cl.
CPC ............... *H04L 67/16* (2013.01); *H04L 29/04* (2013.01); *H04L 69/16* (2013.01); *H04L 69/22* (2013.01); *H04L 69/14* (2013.01); *H04L 69/161* (2013.01)
USPC .......................................... 709/217; 709/223

(58) Field of Classification Search
CPC ......... H04L 67/16; H04L 69/14; H04L 69/16; H04L 69/22; H04L 69/161
USPC ........................................ 709/217; 358/1.15
See application file for complete search history.

(56) References Cited

U.S. PATENT DOCUMENTS 6,069,877 A *  5/2000  Yang ........................... 370/252
6,301,012 B1 * 10/2001  White et al. ................. 358/1.15
6,424,424 B1 *  7/2002  Lomas et al. ................ 358/1.14
(Continued)

FOREIGN PATENT DOCUMENTS

CN      1449158 A       10/2003
JP      2000-181849 A2   6/2000
JP      2009-077281 A    4/2009

OTHER PUBLICATIONS

N. Sriskanthan, D. Tandon, and K.K. Lee, "Protocol for Plug and Play in Bluetooth based [sic] Home Networks," May 2004, IEEE, 0098 3063/04, 457-462.*

(Continued)

*Primary Examiner* — Joshua Joo
(74) *Attorney, Agent, or Firm* — Rossi, Kimms & McDowell LLP

(57) ABSTRACT

A communication apparatus is provided with network interfaces. A control unit provides an application programming interface for an application that runs on the communication apparatus. A transmission unit transmits a search packet via the respective network interfaces in response to a request from the application. A reception unit receives a response packet in response to the search packet that the transmission unit transmits. A first determination unit determines whether the information showing a transmitting source of the response packet that the reception unit received is stored in a storage unit. The control unit stores the information showing the transmitting source of the response packet received into the storage unit and transfers the response packet received to the application, when the first determination unit determines that the information showing the transmitting source of the response packet received is not stored in the storage unit.

8 Claims, 10 Drawing Sheets

(51) Int. Cl.
*H04L 29/04* (2006.01)
*H04L 29/06* (2006.01)

(56) References Cited

U.S. PATENT DOCUMENTS

| | | | |
|---|---|---|---|
| 6,839,755 B1 | 1/2005 | Kumpf et al. | |
| 6,920,506 B2 * | 7/2005 | Barnard et al. | 709/245 |
| 7,599,365 B1 * | 10/2009 | Sabol et al. | 370/389 |
| 7,660,305 B1 * | 2/2010 | Wiget et al. | 370/392 |
| 7,752,298 B2 * | 7/2010 | Fujii et al. | 709/223 |
| 8,001,227 B2 * | 8/2011 | Shin et al. | 709/223 |
| 8,031,724 B2 * | 10/2011 | Ha et al. | 370/401 |
| 8,059,288 B2 * | 11/2011 | Katano | 358/1.15 |
| 8,340,572 B2 * | 12/2012 | Duffy et al. | 455/7 |
| 2004/0064506 A1 * | 4/2004 | Ohara | 709/204 |
| 2005/0025070 A1 * | 2/2005 | Yamada | 370/254 |
| 2005/0129064 A1 * | 6/2005 | Mora | 370/469 |
| 2005/0226171 A1 * | 10/2005 | Uchikawa | 370/254 |
| 2006/0159032 A1 * | 7/2006 | Ukrainetz et al. | 370/254 |
| 2007/0106910 A1 * | 5/2007 | Mizuno | 713/189 |
| 2007/0237141 A1 * | 10/2007 | Marchese | 370/389 |
| 2007/0257777 A1 * | 11/2007 | Kim et al. | 340/146.2 |
| 2008/0028059 A1 * | 1/2008 | Shin et al. | 709/223 |
| 2008/0028060 A1 * | 1/2008 | Fukasawa et al. | 709/223 |
| 2008/0109822 A1 * | 5/2008 | Chokshi et al. | 719/318 |
| 2009/0113542 A1 * | 4/2009 | Price | 726/15 |
| 2009/0125618 A1 * | 5/2009 | Huff et al. | 709/223 |
| 2010/0020809 A1 * | 1/2010 | Jones et al. | 370/395.53 |

OTHER PUBLICATIONS

E. Guttman et al., "Service Location Protocol, Version 2," Jun. 1999, The Internet Scoiety, RFC 2608, 1, 3-6.*

A. Presser et al., "UPnP Device Architecture 1.1," Oct. 15, 2008, UPnP Forum, 8-11, 13-17, 19-22, 23, 31, 36-43, 69, 74-75, 83.*

Notice of the First Office Action for corresponding CN 201010500585.5, dated Feb. 28, 2013. English translation provided.

* cited by examiner

FIG. 11A

APPARATUS SEARCH RESULT

- ■ SECOND MULTIFUNCTIONAL ~1101
  PERIPHERAL DEVICE E

- ■ SECOND MULTIFUNCTIONAL ~1102
  PERIPHERAL DEVICE

- ■ FIRST MULTIFUNCTIONAL ~1103
  PERIPHERAL DEVICE

FIG. 11B

APPARATUS SEARCH RESULT

- ■ SECOND MULTIFUNCTIONAL ~1201
  PERIPHERAL DEVICE

FIG. 12A

APPARATUS SEARCH POLICY

■ DEVICE ITSELF IS INCLUDED
IN APPARATUS SEARCH RESULT

| YES | NO |

FIG. 12B

APPARATUS SEARCH INTERFACE POLICY

■ DESIGNATE INTERFACE TO
SEARCH APPARATUS

ETH0: | ON | OFF |
ETH1: | ON | OFF |

COMMUNICATION APPARATUS PROVIDED WITH NETWORK INTERFACES, CONTROL METHOD THEREFOR, AND STORAGE MEDIUM STORING CONTROL PROGRAM THEREFOR

BACKGROUND OF THE INVENTION

1. Field of the Invention

The present invention relates to a communication apparatus provided with a plurality of network interfaces, a control method therefor, and a storage medium storing a control program therefor.

2. Description of the Related Art

In recent years, a communication apparatus that can search for other devices on a network is developed in order to provide a service while devices such as image forming apparatuses cooperate mutually. The communication apparatus generally uses a method using a multicast packet or a broadcast packet (for example, see Japanese Laid-Open Patent Publication (Kokai) No. 2000-181849 (JP 2000-181849A)).

The multicast packet is an IP (Internet Protocol) packet used when transmitting the same data to specific devices that stand on a network. One of the features of the multicast packet is that a TTL (TimeToLive) value is included in a packet. The TTL value expresses life time of the IP packet, and the value decreases one by one when passing through a router. That is, when the TTL value is set to "1" or more at a transmitting source of the multicast packet, it becomes possible to transmit the same multicast packet to networks (subnets) in a wide area beyond a router.

On the other hand, the broadcast packet is an IP packet used when transmitting the same data to many and unspecified devices that stand on a network. The broadcast packet cannot exceed a router, but can be transmitted only to devices on the network (subnet) that is formed by the router. As compared with this, a packet that specifies a single device that stands on a network and is transmitted to an IP address of the device is called a unicast packet.

Conventionally, a multi-home device that has a plurality of network interfaces (I/F) sends out a multicast packet or a broadcast packet from the network interfaces when searching for other devices on a network. In this case, the multi-home device of which the network interfaces belong to the same subnet has a problem in that device-search responses are received in duplication from devices that stand on the subnet.

Since the multi-home device of which the network interfaces connect with different subnets becomes possible to search beyond a subnet when searching with the multicast packet of which the TTL value is set to "1" or more, the same problem occurs.

SUMMARY OF THE INVENTION

The present invention provides a communication apparatus, a control method therefor, and a storage medium storing a control program therefor that are capable of searching a necessary device when the communication apparatus provided with a plurality of network interfaces searches a device without correcting an application running on the apparatus concerned.

Accordingly, a first aspect of the present invention provides a communication apparatus provided with network interfaces comprising a control unit configured to provide an application programming interface for an application that runs on the communication apparatus, a transmission unit configured to transmit a search packet via the respective network interfaces in response to a request from the application, a reception unit configured to receive a response packet in response to the search packet that the transmission unit transmits, and a first determination unit configured to determine whether the information showing a transmitting source of the response packet that the reception unit received is stored in a storage unit, wherein the control unit stores the information showing the transmitting source of the response packet received into the storage unit and transfers the response packet received to the application, when the first determination unit determines that the information showing the transmitting source of the response packet received is not stored in the storage unit.

Accordingly, a second aspect of the present invention provides a control method for a communication apparatus provided with network interfaces and a control unit that provides an application programming interface for an application that runs on the apparatus itself, the control method comprising a transmission step of transmitting a search packet via the respective network interfaces in response to a request from the application, a reception step of receiving a response packet in response to the search packet that is transmitted in the transmission step, a first determination step of determining whether the information showing a transmitting source of the response packet that is received in the reception step is stored in a storage unit, and a control step of storing the information showing the transmitting source of the response packet received into the storage unit and of transferring the response packet received to the application, when it is determined that the information showing the transmitting source of the response packet received is not stored in the storage unit in the first determination step.

Accordingly, a third aspect of the present invention provides a computer-readable storage medium storing a program causing a computer to execute the above-mentioned control method for the communication apparatus.

According to the present invention, the problem in that unnecessary devices are retrieved when the communication apparatus that is provided with a plurality of network interfaces searches a device can be solved without correcting the application running on the communication apparatus concerned.

Further features of the present invention will become apparent from the following description of exemplary embodiments with reference to the attached drawings.

BRIEF DESCRIPTION OF THE DRAWINGS

FIG. 11A and FIG. 11B are views showing examples of apparatus search results displayed at the first multifunctional peripheral device.

FIG. 12A and FIG. 12B are views showing examples of operation screens displayed at the first multifunctional peripheral device.

DESCRIPTION OF THE EMBODIMENTS

Hereafter, embodiments according to the present invention will be described in detail with reference to the drawings.

Figure 1:
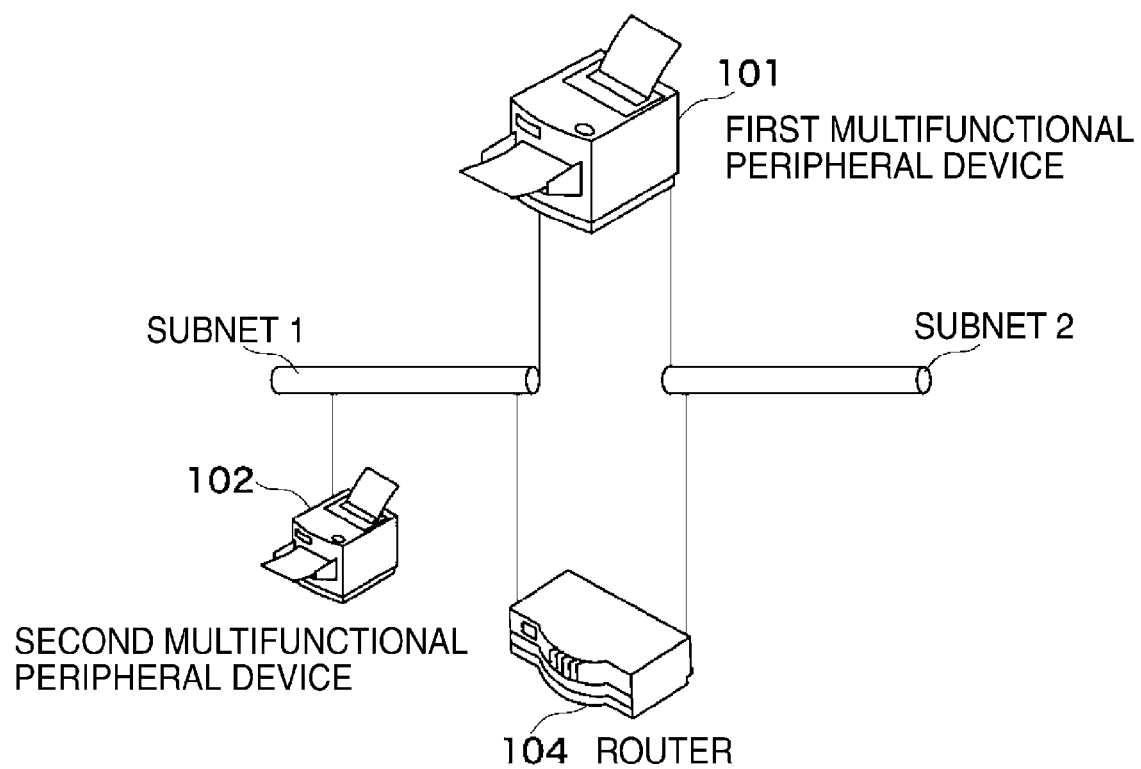
FIG. 1 is a configuration diagram showing an example of a network environment in which an image forming apparatus to which the present invention is applied exists.

FIG. 1 is a configuration diagram showing an example of a network environment in which an image forming apparatus to which the present invention is applied exists.

The first multifunctional peripheral device 101 is an image forming apparatus provided with a print function, a scanner function, etc., is provided with two network interfaces (network I/Fs), and is connected to mutually different networks (subnets 1 and 2). The subnet 1 and the subnet 2 are mutually connected via a router 104.

The first multifunctional peripheral device 101 has a function to transmit a multicast packet and a broadcast packet to at least one of the subnet 1 and the subnet 2, and to search apparatuses on the networks. The first multifunctional peripheral device 101 has a function to receive the multicast packet and the broadcast packet from the subnet 1 or the subnet 2, and to respond to an apparatus search by another apparatus on the networks.

A second multifunctional peripheral device 102 is an image forming apparatus provided with a print function, a scanner function, etc., is provided with one network I/F, and is connected to the subnet 1. The second multifunctional peripheral device 102 has a function to receive the multicast packet and the broadcast packet from the subnet 1, and to respond to an apparatus search by another apparatus on the network.

It should be noted that this embodiment employs an SLP (Service Location Protocol) as an apparatus search protocol that uses the multicast packet. A TTL value in an SLP apparatus search packet is set as "1".

Next, the hardware and software configurations of the first and second multifunctional peripheral devices 101 and 102 in FIG. 1 will be described.

Figure 2:
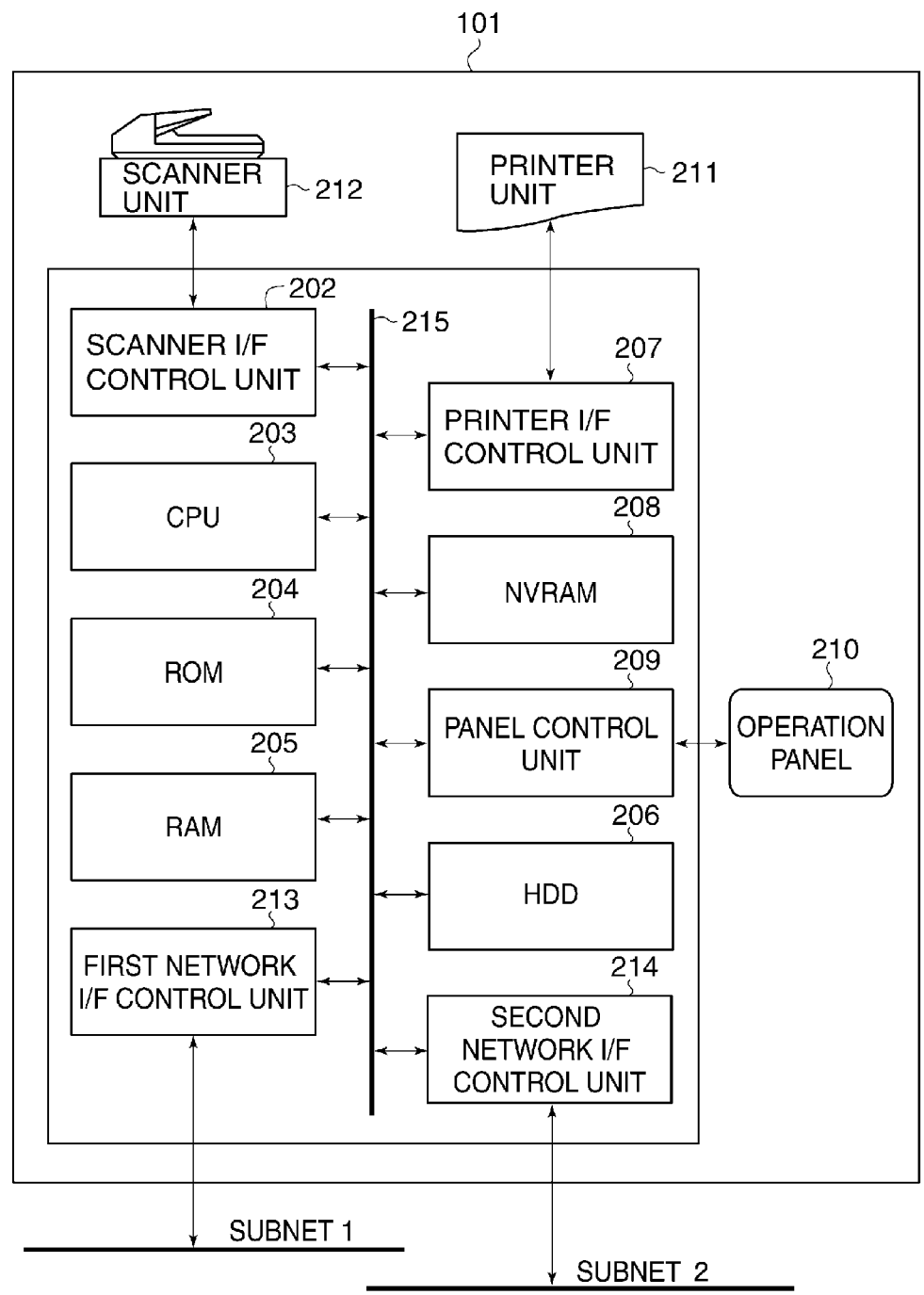
FIG. 2 is a block diagram schematically showing a hardware configuration of a first multifunctional peripheral device shown in FIG. 1.

FIG. 2 is a block diagram schematically showing the hardware configuration of the first multifunctional peripheral device 101 shown in FIG. 1.

The first multifunctional peripheral device 101 is provided with the hardware described below. A scanner I/F control unit 202 connects to a scanner unit 212 that reads an image of an original, and controls input/output of image data etc. with the scanner unit 212. A CPU 203 executes software programs stored in the first multifunctional peripheral device 101, and controls the whole of apparatus.

A ROM 204 is a read-only memory that stores a boot program for the apparatus and data such as fixed parameters. A RAM 205 is a random access memory that temporarily stores data required when the CPU 203 controls the apparatus, etc. An HDD 206 is a hard disk drive that stores various kinds of data such as print data.

A printer I/F control unit 207 connects to a printer unit 211 that prints data, and controls input/output of the print data etc. with the printer unit 211. An NVRAM 208 is a nonvolatile memory that saves various setting values of the printer unit 211. A panel control unit 209 controls an operation panel 210 as a display device that consists of an LCD (Liquid Crystal Display), a touch panel, etc., displays pieces of information, and receives instructions inputted by a user.

A first network I/F control unit 213 consists of a network interface card etc., connects to the subnet 1, and controls transmission and reception of data with the subnet 1. Like the first network I/F control unit 213, a second network I/F control unit 214 consists of a network interface card etc., connects to the subnet 2, and controls transmission and reception of data with the subnet 2.

A bus 215 is a system bus that mutually connects the scanner I/F control unit 202, the CPU 203, the ROM 204, etc. as shown in the figure, and transmits control signals from the CPU 203 and the data signal among the units.

Figure 3:
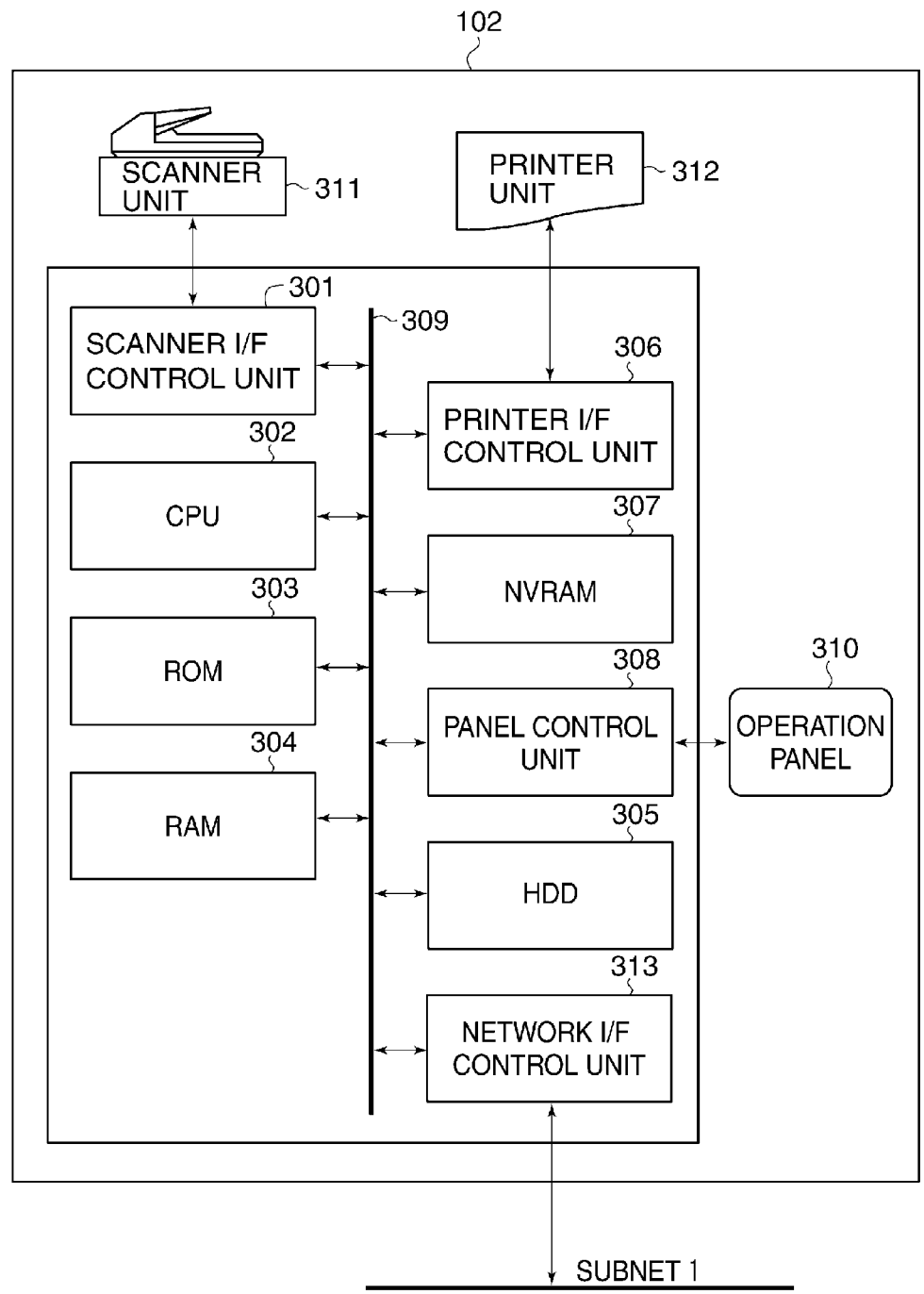
FIG. 3 is a block diagram schematically showing a hardware configuration of a second multifunctional peripheral device shown in FIG. 1.

FIG. 3 is a block diagram schematically showing the hardware configuration of the second multifunctional peripheral device 102 shown in FIG. 1.

The second multifunctional peripheral device 102 is provided with the hardware described below. A scanner I/F control unit 301 connects to a scanner unit 311 that reads an image of an original, and controls input/output of data with the scanner unit 311. A CPU 302 executes software programs stored in the second multifunctional peripheral device 102, and controls the whole of apparatus.

A ROM 303 is a read-only memory that stores a boot program for the apparatus and data such as fixed parameters. A RAM 304 is a random access memory that temporarily stores data required when the CPU 302 controls the apparatus, etc. An HDD 305 is a hard disk drive that stores various kinds of data such as print data.

A printer I/F control unit 306 connects to a printer unit 312 that prints data, and controls input/output of the print data etc. with the printer unit 312. An NVRAM 307 is a nonvolatile memory that saves various setting values of the printer unit 312. A panel control unit 308 controls an operation panel 310 as a display device that consists of an LCD (Liquid Crystal Display), a touch panel, etc., displays pieces of information, and receives instructions inputted by a user.

A network I/F control unit 313 consists of a network interface card etc., connects to the subnet 1, and controls transmission and reception of data with the subnet 1. A bus 309 is a system bus that mutually connects the scanner I/F control unit 301, the CPU 302, the ROM 303, etc. as shown in the figure, and transmits control signals from the CPU 302 and the data signal among the units.

Figure 4:
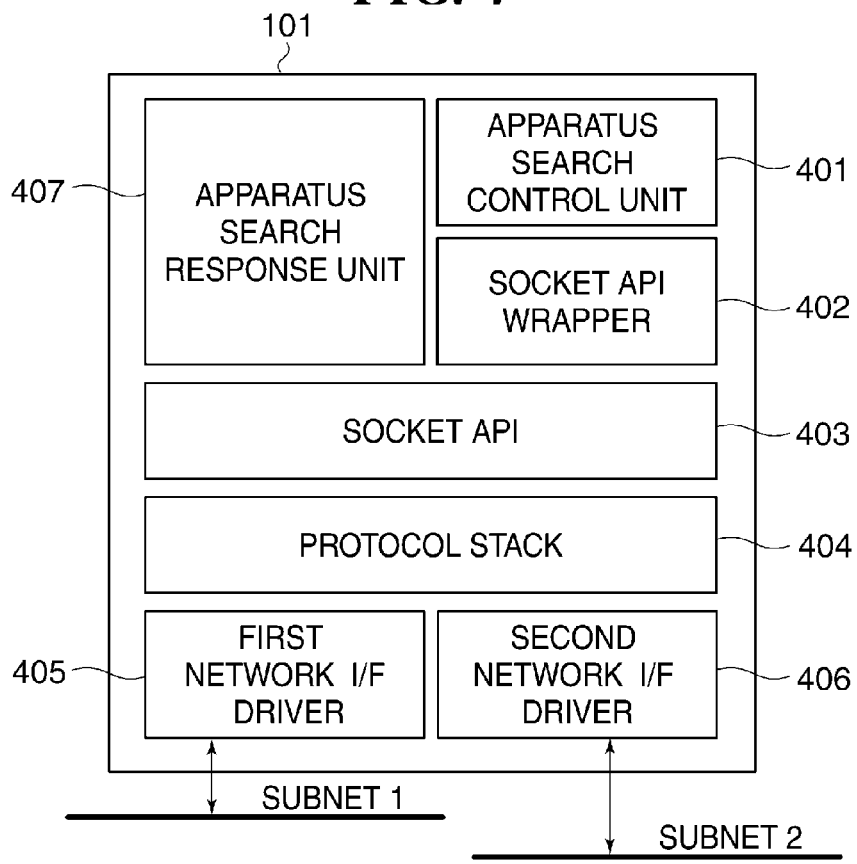
FIG. 4 is a block diagram schematically showing a software configuration of the first multifunctional peripheral device.

FIG. 4 is a block diagram schematically showing a software configuration of the first multifunctional peripheral device 101. It should be noted that FIG. 4 only shows the main part in connection with the present invention.

A protocol stack 404 controls a TCP (Transmission Control Protocol)/IP protocol, and a UDP (User Datagram Protocol)/IP protocol. The TCP and the UDP belong to the fourth layer (transport layer) in the OSI reference model, and act as a bridge between the protocol belonging to the IP layer and the protocol belonging to the fifth layer (session layer). A TCP header and a UDP header include port numbers that are used to identify higher-level protocols. For example, the port number "427" of the TCP header is used to identify the SLP.

The protocol stack 404 is used from another software module (application). An interface part between the protocol stack 404 and an application is called a socket, and an identifier (socket identifier) that uniquely identifies a socket is assigned to each socket.

A socket API 403 is an API (Application Programming Interface) provided in order that a higher-level protocol uses the protocol stack 404. In recent years, the API is uniformly standardized by a POSIX (Portable Operating System Interface for UNIX (registered trademark)) etc., and has a common format in various systems. The socket API 403 has a socket identifier as an argument that the protocol stack 404 uses to identify an application that uses the protocol stack 404.

A socket API wrapper 402 is a wrapper for using the socket API 403, and is used from an apparatus search control unit 401. Since the socket API wrapper 402 is provided in the same format as the socket API 403, an application is able to use the socket API wrapper 402 without changing the format used when calling the socket API 403 directly.

A first network I/F driver 405 transfers data between the first network I/F control unit 213 connected to the subnet 1 and the protocol stack 404. A second network I/F driver 406 transfers data between the second network I/F control unit 214 connected to the subnet 2 and the protocol stack 404.

The apparatus search control unit 401 is a module that controls an apparatus search. The apparatus search control unit 401 receives a trigger of the apparatus search, and processes an apparatus search result. For example, the apparatus search control unit 401 receives the apparatus search instruction from a user via the operation panel 210 and the panel control unit 209, and executes an apparatus search when receiving the instruction as a trigger. The apparatus search control unit 401 displays an apparatus search result on the operation panel 210 via the panel control unit 209 to notify a user.

When receiving the trigger of the apparatus search, the apparatus search control unit 401 forms an SLP apparatus search packet for performing an apparatus search, and transmits the packet using the socket API wrapper 402. Then, the apparatus search control unit 401 receives a SLP search response packet using the socket API wrapper 402, and obtains an apparatus search result (see RFC2165 for the details of the SLP apparatus search packet).

An apparatus search response unit 407 receives an SLP apparatus search packet from another apparatus on the network using the socket API 403. When receiving an SLP apparatus search packet, the apparatus search response unit 407 forms an SLP search response packet, and transmits the packet using the socket API 403.

Figure 5:
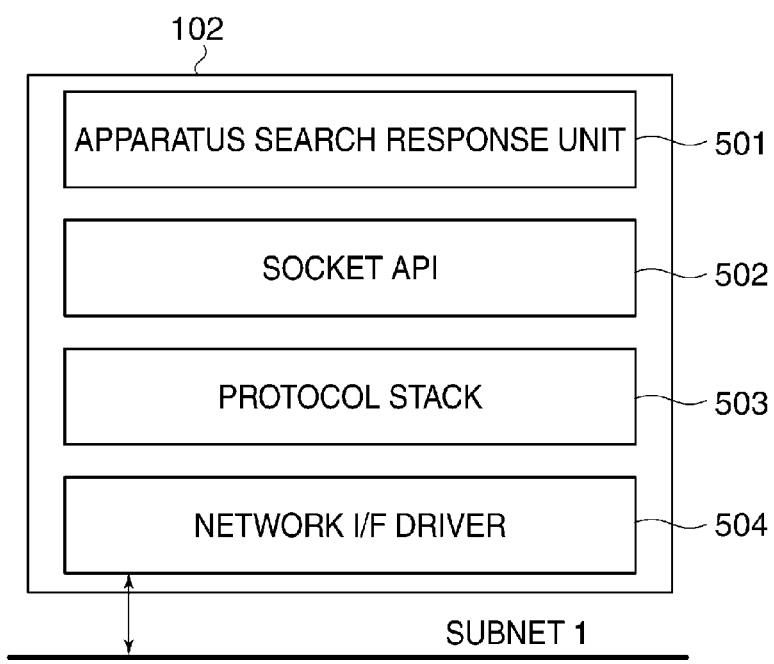
FIG. 5 is a block diagram schematically showing a software configuration of the second multifunctional peripheral device.

FIG. 5 is a block diagram schematically showing a software configuration of the second multifunctional peripheral device 102. It should be noted that FIG. 5 only shows the main part in connection with the present invention.

When receiving an apparatus search request from another apparatus on the network, an apparatus search response unit 501 generates response data. A protocol stack 503 controls the protocols of TCP/IP and UDP/IP. A socket API 502 is an API provided in order to use the protocol stack 503. A network I/F driver 504 transfer data between the network I/F control unit 313 connected to the subnet 1 and the protocol stack 503.

Figure 6A:
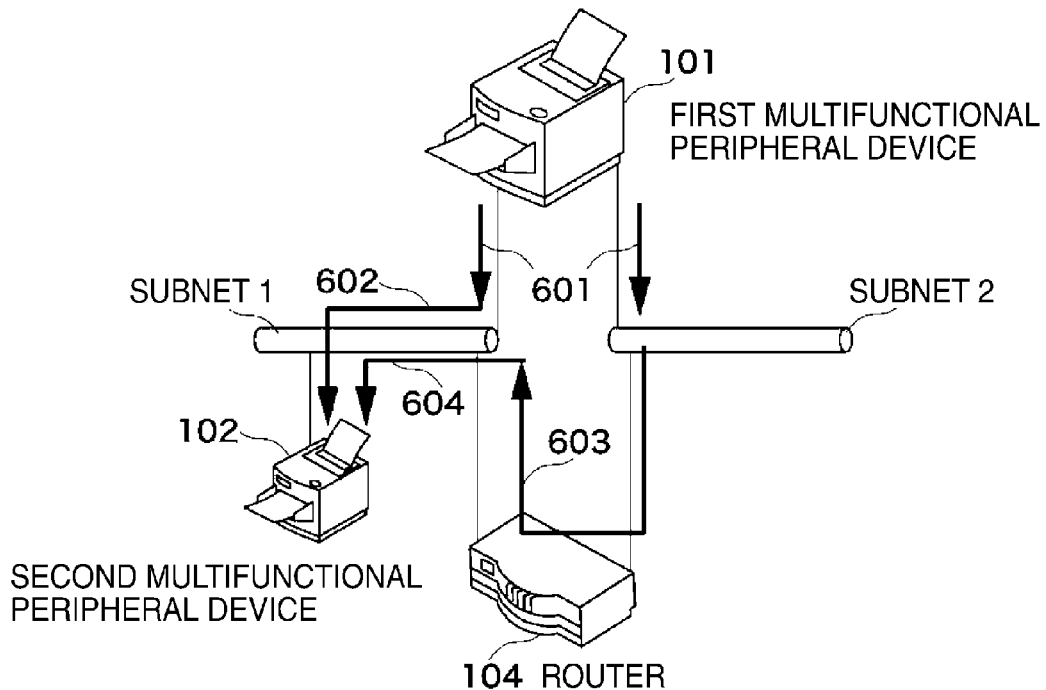
FIG. 6A and FIG. 6B are views showing data flows at the time when an apparatus search control unit on the first multifunctional peripheral device transmits an SLP apparatus search packet.
Figure 6B:
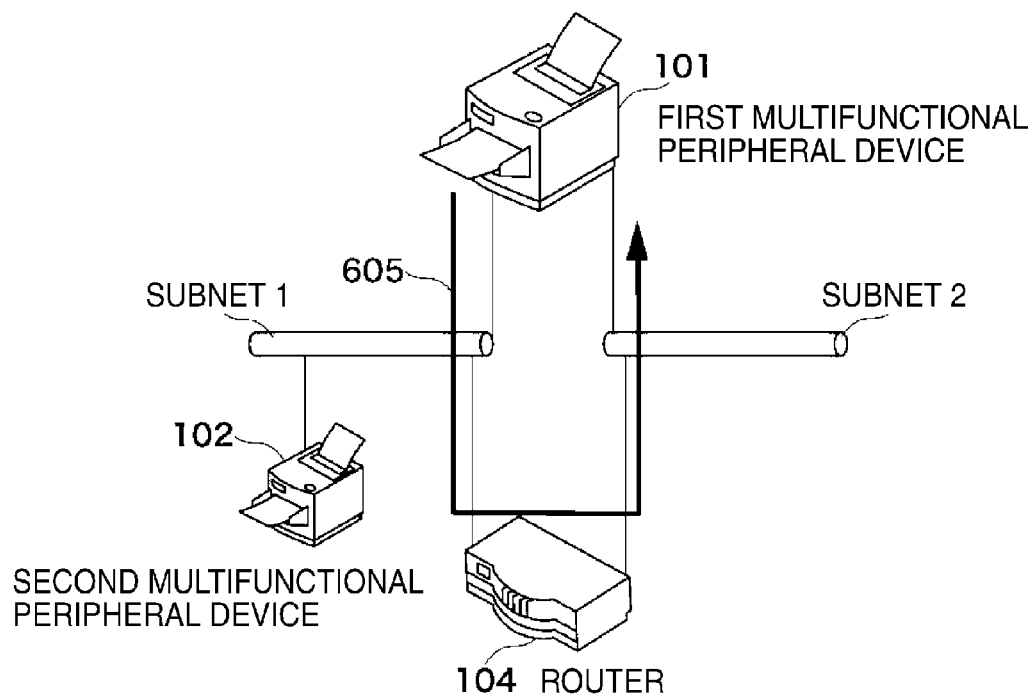

FIG. 6A and FIG. 6B are views showing data flows at the time when the apparatus search control unit 401 on the first multifunctional peripheral device 101 transmits an SLP apparatus search packet.

In FIG. 6A, the SLP apparatus search packet formed by the apparatus search control unit 401 is sent out to the subnet 1 and the subnet 2 via the first network I/F driver 405 and the second network I/F driver 406 (601). The SLP apparatus search packet sent out to the subnet 1 reaches the second multifunctional peripheral device 102 linked to the subnet 1 (602). On the other hand, since the TTL value of an SLP apparatus search packet is 1, via the router 104, the SLP apparatus search packet sent out to the subnet 2 is transmitted to the subnet 1 (603), and reaches the second multifunctional peripheral device 102 connected to the subnet 1 (604).

In FIG. 6B, the SLP apparatus search packet sent out to the subnet 1 is sent out to the subnet 2 via the router 104, and also reaches to the second network I/F control unit 214 in the first multifunctional peripheral device 101 linked to the subnet 2 (605).

Figure 7A:
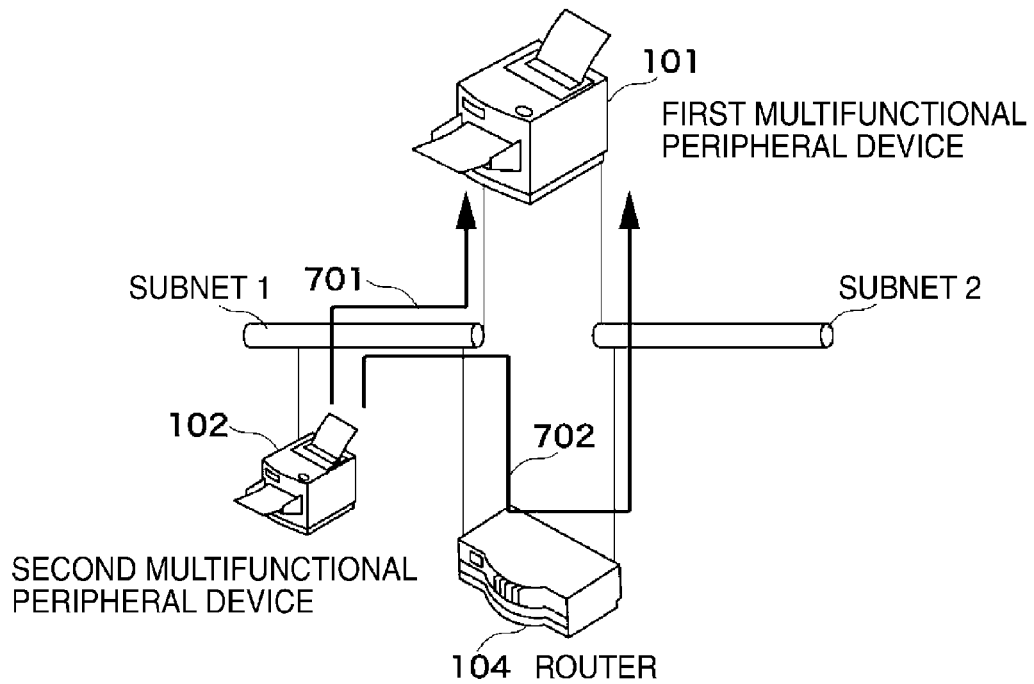
FIG. 7A and FIG. 7B are views showing flows of an SLP search response packet sent out from the second multifunctional peripheral device.
Figure 7B:
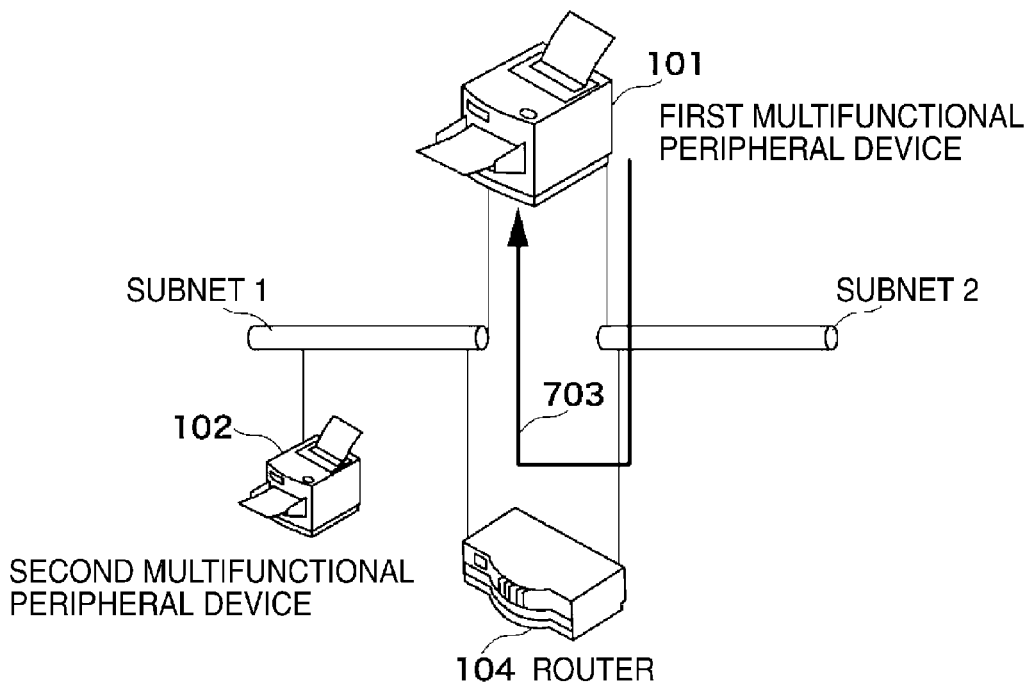

FIG. 7A and FIG. 7B are views showing flows of an SLP search response packet sent out from the second multifunctional peripheral device 102.

In FIG. 7A, the second multifunctional peripheral device 102 transmits the SLP search response packet 701 that is a response to the SLP apparatus search packet 602 that is directly received from the first multifunctional peripheral device 101. The second multifunctional peripheral device 102 transmits the SLP search response packet 702 that is a response to the received SLP apparatus search packet 604 via the router 104. As a result, the first multifunctional peripheral device 101 receives the SLP search response packets twice from the second multifunctional peripheral device 102.

In FIG. 7B, the SLP apparatus search packet that reaches the second network I/F control unit 214 in the first multifunctional peripheral device 101 is received by the apparatus search response unit 407 via the second network I/F driver 406, the protocol stack 404, and the socket API 403. The apparatus search response unit 407 transmits an SLP search response packet 703 that is a response to the SLP apparatus search packet 605. As a result, the first multifunctional peripheral device 101 receives the SLP search response packet from the device itself, and the apparatus search result includes the device itself.

Figures 8, 9:
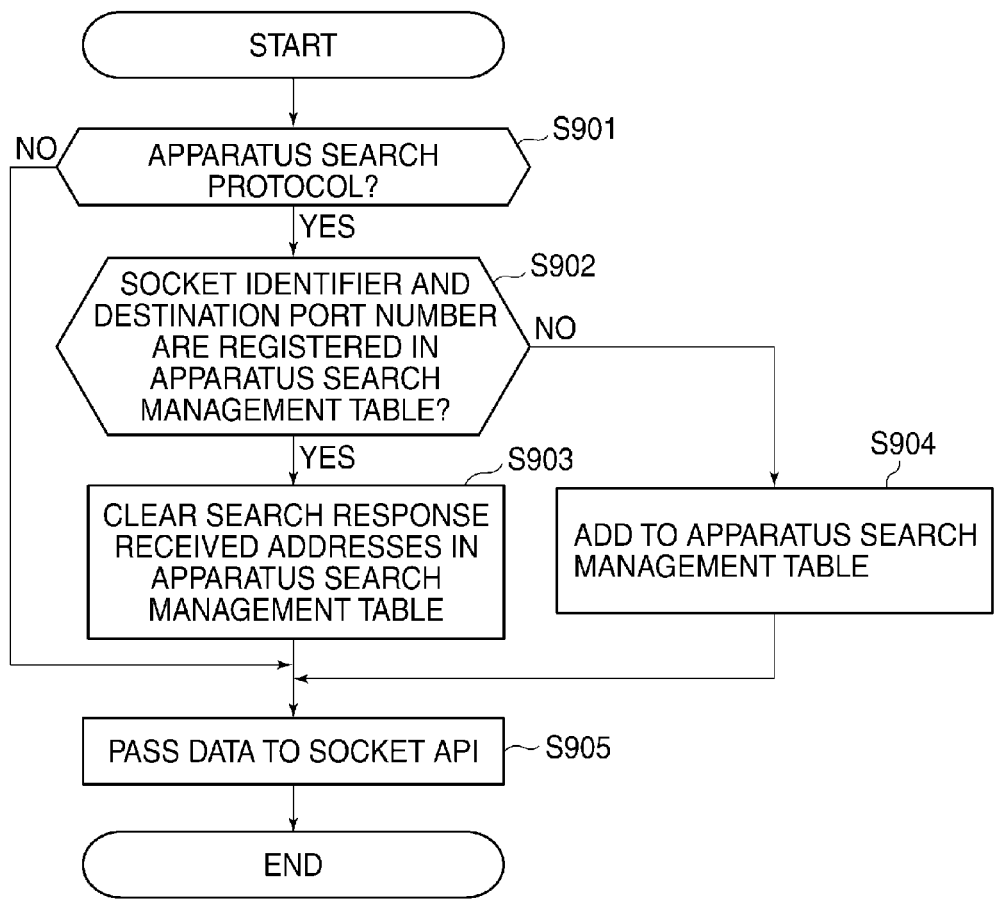
FIG. 8 is a view showing an apparatus search management table that a socket API wrapper in the first multifunctional peripheral device holds.
FIG. 9 is a flowchart showing an example of a process that the socket API wrapper executes in the first multifunctional peripheral device when transmitting the search response packet.

FIG. 8 is a view showing an apparatus search management table that the socket API wrapper 402 in the first multifunctional peripheral device 101 holds.

In FIG. 8, the apparatus search management table 800 comprises elements described below. A socket identifier 801 is set up to identify an application that uses the protocol stack 404. A destination port number 802 is set up to mean the destination port number of TCP and UDP connections that the socket identifier manages, and to identify the using protocol. The socket identifier 801 and the destination port number 802 serve as identification information about search data, for example.

The IP address of the destination that receives the response when performing the apparatus search to the socket identifier 801 and the destination port number 802 is set to a search response received address 803.

The relationship among the socket identifier 801, the destination port number 802, and the search response received address 803 is 1:1:n (n is an integer larger than 1). In the illustrated example, "172.24.24.244" and "172.24.24.245" are set up to the search response received address that uses the socket identifier "6" and the destination port number "427" (SLP).

FIG. 9 is a flowchart showing an example of a process executed by the socket API wrapper 402 when the socket API wrapper 402 is called from the apparatus search control unit 401 to transmit an SLP apparatus search packet in the first multifunctional peripheral device 101.

In FIG. 9, the socket API wrapper 402 refers to the port number of the data passed from the apparatus search control unit 401, and determines whether the protocol deduced from the port number is the apparatus search protocol (step S901). For example, since the port number is "427" when the SLP apparatus search packet is passed from the apparatus search control unit 401, the socket API wrapper 402 determines that the protocol is the apparatus search protocol.

When it is determined that the protocol according to the port number is not the apparatus search protocol as a result of the determination in the step S901, the socket API wrapper 402 passes the data to the socket API 403 as-is (step S905), and finishes this process. On the other hand, when it is determined that the protocol according to the port number is the apparatus search protocol in the step S901, the process proceeds to step S902.

In step S902, the socket API wrapper 402 refers to the apparatus search management table 800, and determines whether the applicable socket identifier and destination port number are registered. When it is determined that the applicable information is registered, the socket API wrapper 402 deletes (clears) all the search response received addresses corresponding to the socket identifier and the destination port number from the apparatus search management table 800 (step S903). For example, in the apparatus search management table 800 shown in FIG. 8, all the addresses such as "172.24.24.244" and "172.24.24.245" corresponding to the socket identifier "6" and the destination port number "427" are deleted. The reason why the set-up information is deleted in the step S903 is to avoid being treated as an already responded address, when the apparatus search is continuously executed from the same application.

On the other hand, when it is determined that the applicable information is not registered in the step S902, the socket API wrapper 402 newly registers a socket identifier and a destination port number into the apparatus search management table 800 (step S904), and proceeds with the process to step S905.

Figure 10:
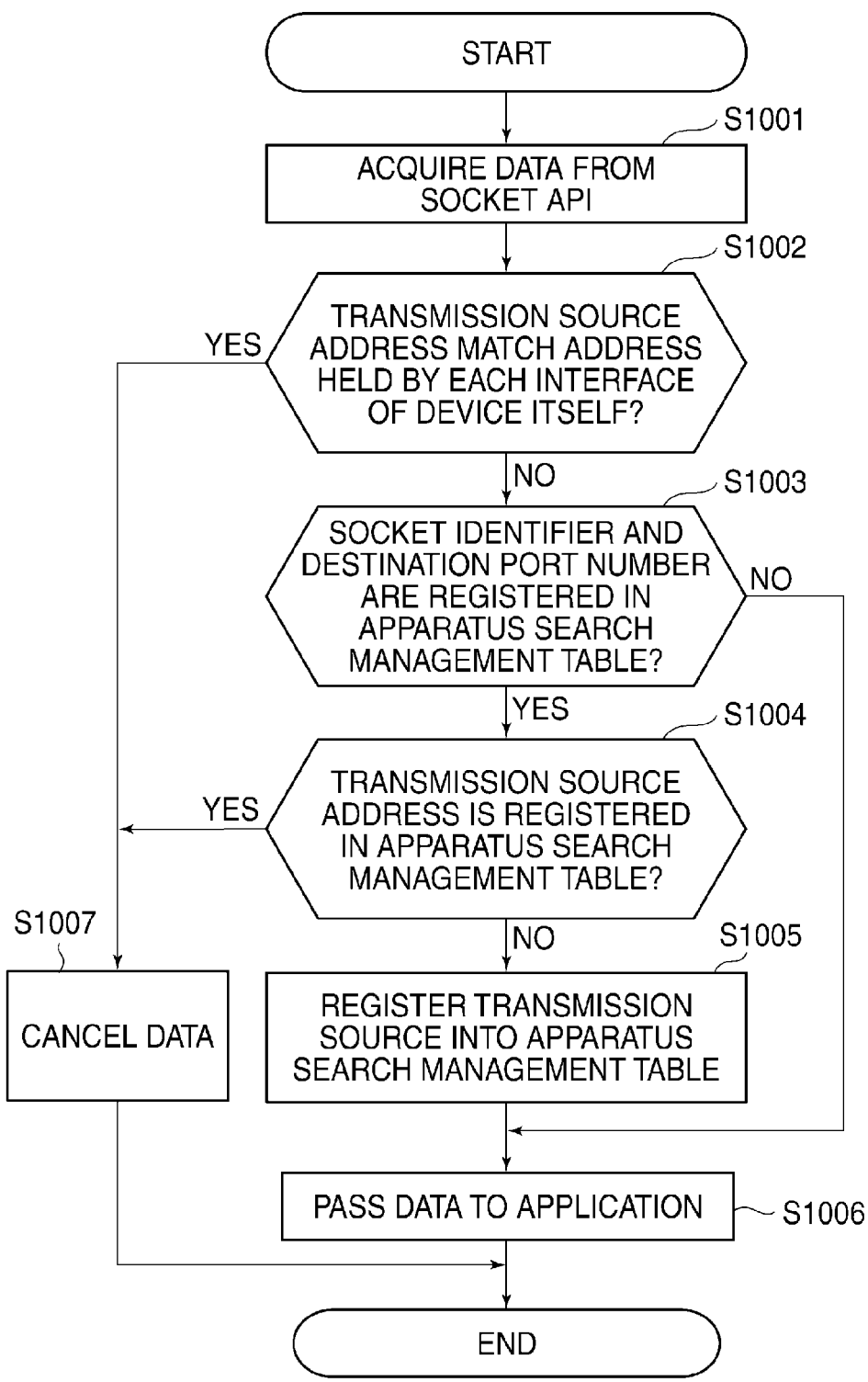
FIG. 10 is a flowchart showing an example of a process that the socket API wrapper executes in the first multifunctional peripheral device when receiving the search response packet.

FIG. 10 is a flowchart showing an example of a process executed by the socket API wrapper 402 when the socket API wrapper 402 is called from the apparatus search control unit 401 to receive an SLP search response packet in the first multifunctional peripheral device 101.

In FIG. 10, the socket API wrapper 402 passes a socket identifier to the protocol stack 404 via the socket API 403, and acquires the data corresponding to the socket identifier (step S1001).

As shown by the reference numeral 605 in FIG. 6B, the second network I/F control unit 214 of the first multifunctional peripheral device 101 receives the SLP apparatus search packet of which the source address matches the address held by the first network I/F control unit 213. On the other hand, as shown by the reference numeral 703 in FIG. 7B, the first network I/F control unit 213 of the first multifunctional peripheral device 101 receives the SLP apparatus search packet of which the source address matches the address held by the second network I/F control unit 214. In order to cancel such data, the socket API wrapper 402 determines whether the source address of the received data matches an address (an address of the device itself) held by the first and second network I/F control units 213 and 214 of the device itself (step S1002). When it is determined that the source address of the received data matches the address of the network I/F of the device itself as a result of the determination in the step S1002, the socket API wrapper 402 cancels the corresponding data (step S1007), and finishes this process. On the other hand, when it is determined that the source address does not match the address of the network I/F of the device itself in the step S1002, the process proceeds to step S1003.

In the step S1003, the socket API wrapper 402 refers to the apparatus search management table 800, and determines whether the socket identifier and destination port number of the data obtained in the step S1001 are registered. When it is determined that the applicable information is not registered, the socket API wrapper 402 determines that the received data is not a response to the apparatus search packet, passes the data concerned to the application (step S1006), and finishes this process.

On the other hand, when it is determined that the applicable information is registered in the step S1003, the socket API wrapper 402 determines whether the source address of the data is registered in the apparatus search management table 800 (step S1004). Here, it is determined whether the source address is registered to the search response received address 803 in the apparatus search management table 800.

When it is determined that the source address is registered as a result of the determination in the step S1004, since the SLP search response is transmitted from the apparatus that has already received the SLP apparatus search packet, the socket API wrapper 402 cancels the received data (step S1007), and finishes this process. On the other hand, when it is determined that the source address is not registered in the step S1004, the process proceeds to step S1005.

In the step S1005, the socket API wrapper 402 registers the source address of data to the search response received address in the apparatus search management table 800, and proceeds with the process to step S1006. In the step S1006, the socket API wrapper 402 passes only the SLP search response packet to the application (not shown), and finishes this process.

Next, the search results displayed on the operation panel 210 of the first multifunctional peripheral device 101 will be described.

FIG. 11A shows the apparatus search result assumed when the apparatus search control unit 401 searches an apparatus without using the socket API wrapper 402. As a result, the information about the second multifunctional peripheral device 102 duplicates (1101 and 1102). The information about the device itself is obtained as the apparatus search result (1103).

On the other hand, FIG. 11B shows the apparatus search result obtained when the apparatus search control unit 401 searches an apparatus while using the socket API wrapper 402. As a result, the information about the second multifunctional peripheral device 102 is obtained without duplication (1201).

FIG. 12A is a view showing an example of the operation screen that enables a user to select whether the device itself is included in the apparatus search result in the first multifunctional peripheral device 101.

For example, when searching the image forming apparatus managed in a unified manner, a setting of an apparatus search policy that a device itself is included in an apparatus search result is forecast. In such a case, this embodiment enables to apply the unified policy by correcting the process flow of the socket API wrapper 402, without correcting each application that searches an apparatus.

FIG. 12B is a view showing an example of the operation screen for designating an interface to search an apparatus in the first multifunctional peripheral device 101.

When searching a connectable apparatus by a certain interface among a plurality of network I/Fs, a setting of a search interface policy is forecast. Also in such a case, this embodiment enables to apply the unified policy by correcting the process flow of the socket API wrapper 402, without correcting each application that searches an apparatus.

On the operation screen shown in FIG. 12B, ETH0 corresponds to the first network I/F control unit 213, and ETH1 corresponds to the second network I/F control unit 214. For example, when the ETH0 is set to OFF and the ETH1 is set to ON as shown in FIG. 12B, the search data is sent out from the second network I/F control unit 214. When both of the ETH0 and ETH1 are ON, the search data is sent out from the first and a second network I/F control units.

According to the above-mentioned embodiment, the socket identifier and the destination port number about the search data sent out to the network, and the search response received address of the response data received in response to the sent-out search data are registered into the apparatus search management table 800. When it is determined that the transmitting source of the data is the device itself according to the transmission source information about the data received from the network, the data concerned is canceled. Further, when it is determined that the transmission source information about the data is registered in the apparatus search management table 800, the data concerned is canceled. When it is determined that the transmission source information about the data is not registered in the apparatus search management table 800, the source address of the data is registered into the apparatus search management table 800, and the data is passed to the application. Accordingly, an apparatus that is necessary when the device search is performed by the communication apparatus having a plurality of network interfaces can be searched without correcting the application running on the communication apparatus concerned.

Alternatively, the process in FIG. 9 and FIG. 10 may be executed only when the first and second network I/F control units send out the search data in the above-mentioned embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-230595, filed on Oct. 2, 2009, which is hereby incorporated by reference herein in its entirety.

What is claimed is:

1. A communication apparatus provided with a first network interface and a second network interface, comprising:
a memory;
a processor connected to said memory,
the processor configured to:
transmit a search packet;
receive a packet;
determine, in a case where a packet is received, whether or not the received packet is a response packet responding to the transmitted search packet; and
transfer, in a case where a first packet is received via the first network interface, and a second packet is received via the second network interface, and it is determined that the received first packet is a first response packet responding to the transmitted search packet and the received second received packet is a second response packet responding to the transmitted search packet, and the source address of the first response packet and the source address of the second response packet are identical, one of the first response packet and the second response packet to an application running on the communication apparatus without transferring the other of the received first response packet and the second response packet,
wherein, in a case where it is determined that a received packet is not a response packet responding to the search packet, the received packet is transferred to the application.

2. The communication apparatus according to claim 1, wherein, in a case where it is determined that the received packet is the response packet, and the first response packet and the second response are identical in source address with each other, the other of the first response packet and the second response packet is cancelled.

3. The communication apparatus according to claim 1, the processor being further configured to:
store, in a case where the search packet is transmitted, identification information corresponding to the search packet,
wherein the determination whether or not the received packet is the response packet corresponding to the search packet, is based on the identification information stored by said storing unit.

4. The communication apparatus according to claim 3, wherein the identification information comprises a combination of a socket identifier and a destination port number.

5. The communication apparatus according to claim 1, wherein, in a case where the first response packet is received before the second response is received, the first response packet is transferred to the application without transferring the second response packet.

6. The communication apparatus according to claim 5, wherein the second response packet is cancelled.

7. A control method for a communication apparatus provided with a first network interface and a second network interface, the control method comprising:
a transmission step of transmitting a search packet;
a reception step of receiving a packet;
a determining step of determining, in a case where said reception step receives a packet, whether or not the received packet is a response packet responding to the search packet transmitted by said transmission step; and
a control step of transferring, in a case where a first packet is received via the first network interface, and a second packet is received via the second network interface, and it is determined that the received first packet is a first response packet responding to the transmitted search packet and the received second received packet is a second response packet responding to the transmitted search packet, and the source address of the first response packet and the source address of the second response packet are identical, one of the first response packet and the second response packet to an application running on the communication apparatus without transferring the other of the first response packet and the second response packet, wherein said control step transfers, in a case where said determining step determines that a received packet is not a response packet responding to the search packet, the received packet to the application.

8. A non-transitory computer-readable storage medium storing a control program causing a computer to execute a control method for a communication apparatus provided with a first network interface and a second network interface, the control method comprising:

a transmission step of transmitting a search packet;

a reception step of receiving a packet;

a determining step of determining, in a case where said reception step receives a packet, whether or not the received packet is a response packet responding to the search packet transmitted by said transmission step; and a control step of transferring, in a case where a first packet is received via the first network interface, and a second packet is received via the second network interface, and it is determined that the received first packet is a first response packet responding to the transmitted search packet and the received second received packet is a second response packet responding to the transmitted search packet, and the source address of the first response packet and the source address of the second response packet are identical, one of the first response packet and the second response packet to an application running on the communication apparatus without transferring the other of the first response packet and the second response packet, wherein said control step transfers, in a case where said determining step determines that a received packet is not a response packet responding to the search packet, the received packet to the application.

\* \* \* \* \*